US008640490B2

(12) United States Patent
Cossenet et al.

(10) Patent No.: US 8,640,490 B2
(45) Date of Patent: Feb. 4, 2014

(54) EVAPORATOR/ABSORBERS COMBINATION, ABSORPTION COOLING DEVICE AND ASSOCIATED MOTOR VEHICLE

(75) Inventors: Michel Cossenet, Yerres (FR); Emmanuel Boudard, Voisins le Bretonneux (FR); Fabien Gerard, Velizy Villacoublay (FR); Vital Bruzzo, San Germano dei Berici Vicenza (IT)

(73) Assignees: Ecoclim S.A., Sion (CH); Peugeot Citroen Automobiles SA, Velizy Villacoublay (FR)

( * ) Notice: Subject to any disclaimer, the term of this patent is extended or adjusted under 35 U.S.C. 154(b) by 1035 days.

(21) Appl. No.: 12/299,268

(22) PCT Filed: May 2, 2007

(86) PCT No.: PCT/FR2007/000749
§ 371 (c)(1),
(2), (4) Date: Feb. 27, 2009

(87) PCT Pub. No.: WO2007/125221
PCT Pub. Date: Nov. 8, 2007

(65) Prior Publication Data
US 2009/0199589 A1 Aug. 13, 2009

(30) Foreign Application Priority Data

May 2, 2006 (FR) ..................................... 06 51568

(51) Int. Cl.
*F25B 15/12* (2006.01)
*B60H 1/32* (2006.01)
*F25D 21/06* (2006.01)
*A23C 3/04* (2006.01)

(52) U.S. Cl.
USPC .................. 62/484; 62/244; 62/476; 62/477; 165/115

(58) Field of Classification Search
USPC ................. 62/244, 476, 477, 478, 238.3, 484
See application file for complete search history.

(56) References Cited

U.S. PATENT DOCUMENTS 4,651,819 A * 3/1987 Yumikura et al. ............ 165/115
5,240,070 A * 8/1993 Ryan ............................. 165/184

(Continued)

FOREIGN PATENT DOCUMENTS

DE 469735 C 12/1928
EP 1160530 A1 12/2001

(Continued)

OTHER PUBLICATIONS

International Search Report mailed Oct. 1, 2007 in PCT/FR2007/000749.

*Primary Examiner* — Khao Huynh
*Assistant Examiner* — Timothy K Trieu
(74) *Attorney, Agent, or Firm* — Nicolas E. Seckel (57) ABSTRACT

This unit (37) comprises an evaporator (45) of liquid refrigerating fluid and an absorber (47) of gaseous refrigerating fluid linked to the evaporator (45). The apparatus (37) includes a migrating chamber (121) for gaseous refrigerant fluid delimited by an evaporation surface (73A) located on the absorber (47) facing the evaporation surface (73A), and through a connecting floor (57) linking these surfaces (73A, 109A). The evaporator (45) comprises a refrigerant fluid collector (65) linked to the evaporation surface (73A) to collect the refrigerant fluid downstream from this surface. The evaporator (45) comprises partitions (67) set out in the chamber (121) and delimiting, on the evaporation surface (73A) at least one area (103) covered by partitions (67) and at least one uncovered evaporation area (105). For application in motor vehicle air conditioning.

23 Claims, 5 Drawing Sheets

(56) References Cited

U.S. PATENT DOCUMENTS

| | | | |
|---|---|---|---|
| 6,009,936 A * | 1/2000 | Kubota et al. | 165/183 |
| 6,176,101 B1 * | 1/2001 | Lowenstein | 62/484 |
| 6,318,117 B1 * | 11/2001 | Jandal et al. | 62/497 |
| 6,817,406 B1 * | 11/2004 | Inoue et al. | 165/115 |

FOREIGN PATENT DOCUMENTS

| | | |
|---|---|---|
| FR | 2871221 A | 12/2005 |
| JP | 05340637 A | 12/1993 |
| JP | 2004176969 A | 6/2004 |
| JP | 2004340468 A | 12/2004 |

* cited by examiner

EVAPORATOR/ABSORBERS COMBINATION, ABSORPTION COOLING DEVICE AND ASSOCIATED MOTOR VEHICLE

BACKGROUND ART

The present invention relates to an evaporator/absorber assembly of the type comprising:

a liquid cooling fluid evaporator which has an upstream liquid cooling fluid supply inlet, a gaseous cooling fluid absorber which is connected to the evaporator and which has an upstream liquid absorbent fluid supply inlet.

An evaporator/absorber assembly of the above-mentioned type is intended to be arranged in an absorption cooling device placed in a motor vehicle in order to provide the frigories required for the climate-control of this vehicle.

WO-A-01/18463 discloses an absorption cooling device comprising a generator in which a mixed fluid comprising a cooling fluid and an absorbent fluid is separated in order to obtain a gaseous current of cooling fluid, and a liquid current of absorbent fluid.

This device further comprises a cooling fluid condenser which receives the gaseous current and which allows the cooling fluid to be reliquefied. This device comprises a cooling fluid evaporator which is connected to the condenser and in which the liquid cooling fluid from the condenser is evaporated using a nozzle. This evaporation produces frigories which are used for the purposes of cooling, via a cooling system which is placed in a heat-exchange relationship with a climate-control system.

The evaporated cooling fluid is conveyed to an absorber which receives a liquid current of absorbent fluid. The liquid current is sprayed in the absorber in order to form very fine drops which absorb the evaporated cooling fluid.

A mixed liquid comprising the cooling fluid and the absorbent fluid is collected in the base of the absorber to be conveyed to the generator.

Such a device efficiently produces frigories which can be used in a climate-control assembly, without using a cooling fluid which is harmful to the environment.

However, if a device of the above-mentioned type is installed in a motor vehicle, the accelerations and the inclinations of the vehicle have a tendency to disrupt the transfer nozzle. Furthermore, such a device is bulky and is not very ergonomic.

An object of the invention is therefore to provide an evaporator/absorber assembly for an absorption cooling device which may readily be installed in a vehicle, in a compact manner, whilst being reliable in terms of operation.

SUMMARY OF THE INVENTION

To this end, the invention relates to an evaporator/absorber assembly of the above-mentioned type, characterised in that the assembly delimits a chamber for migration of gaseous cooling fluid defined by at least one cooling fluid gas transfer surface which is located on the evaporator and connected upstream to the cooling fluid supply inlet, by at least one surface for passage of evaporated cooling fluid located on the absorber facing the or each transfer surface and connected upstream to the absorbent fluid supply inlet, and by a base wall which connects these surfaces, the evaporator comprising:

a liquid cooling fluid collector which is connected to the or each transfer surface in order to collect the liquid cooling fluid downstream of the or each transfer surface; and partition means which are arranged in the chamber and which delimit, on the or each transfer surface, at least one region which is covered by the partition means and at least one uncovered transfer region.

The assembly according to the invention may comprise one or more of the following features, taken in isolation or according to any technically possible combination:

the partition means delimit on the or each transfer surface a covered downstream region which extends transversely over the entire width of the transfer surface and which extends from the base wall to an uncovered transfer region which is located remote from and above the base wall;

the partition means comprise, over the remainder of the or each transfer surface, a reinforcement mesh substantially above the uncovered region in order to maximise the percentage of opening surface-area;

the cooling fluid supply inlet is connected to an upstream edge of the or each transfer surface, the partition means delimiting on the transfer surface, an alternate arrangement of covered transfer regions and uncovered transfer regions between the base wall and the upstream edge;

the partition means comprise, facing the or each uncovered region, a guiding fin which protrudes away from the transfer surface;

each guiding fin is remote from the transfer surface by a distance between 0.5 and 5 mm in order to adapt to the size of the drops which may be formed;

the evaporator comprises at least one member which delimits two opposing transfer surfaces which are connected together by means of lateral surfaces, the partition means extending in a tight manner over the lateral surfaces;

it comprises a porous block which is interposed between the cooling fluid collector and the or each transfer surface;

the cooling fluid collector is located below the base wall and is applied below the base wall;

the absorber comprises:

a collector for a liquid mixed fluid formed by an admixture of absorbent fluid and cooling fluid, connected to the or each passage surface in order to collect the mixed fluid downstream of the or each passage surface; and at least one wall for covering the or each passage surface delimiting on the or each passage surface at least one region covered by the covering wall and at least one downstream uncovered region which extends from the base wall, the downstream uncovered region opening in the chamber via a collection opening which is flush with the base wall;

the covering wall comprises, on the remainder of the or each passage surface, a reinforcement mesh substantially above the downstream uncovered region in order to maximise the percentage of opening surface-area;

the covering wall comprises at least one covered region above the downstream uncovered region;

the or each uncovered passage region is located opposite a covered region of the transfer surface;

the or each uncovered region of the transfer surface is located facing a covered region of the passage surface;

the downstream uncovered region which opens in the chamber comprises a collection opening which is flush with the base wall in order to discharge the liquid fluids present on the base wall into the collector;

the cooling fluid collector comprises at least one cooling fluid receptacle which has a base which is inclined in a first direction towards a liquid cooling fluid discharge outlet, the mixed fluid collector comprising at least one liquid mixed fluid receptacle which has a base which is inclined in a second direction separate from the first direction, towards a mixed fluid discharge outlet.

The invention also relates to an absorption cooling device, of the type comprising:
- a device for generating cooling fluid and absorbent fluid by means of separation of a mixed fluid;
- a cooling fluid condenser, connected to the generator;
- an evaporator/absorber assembly according to any one of the preceding claims, the evaporator being connected to the condenser by means of a cooling fluid supply conduit which opens in the cooling fluid supply inlet, the absorber being connected to the generator via an absorbent fluid supply conduit which opens in the absorbent fluid supply inlet and via a mixed fluid discharge conduit; and
- a cooling system based on a heat-exchange fluid, placed in a heat-exchange relationship with the or each transfer surface, the cooling system comprising a first heat-exchanger located outside the evaporator.

The invention further relates to a motor vehicle, characterised in that it comprises a device as defined above.

BRIEF DESCRIPTION OF THE DRAWINGS

The invention will be better understood from a reading of the following description, given purely by way of example and with reference to the appended drawings, in which.

DETAILED DESCRIPTION OF PARTICULAR EMBODIMENTS

Figure 1:
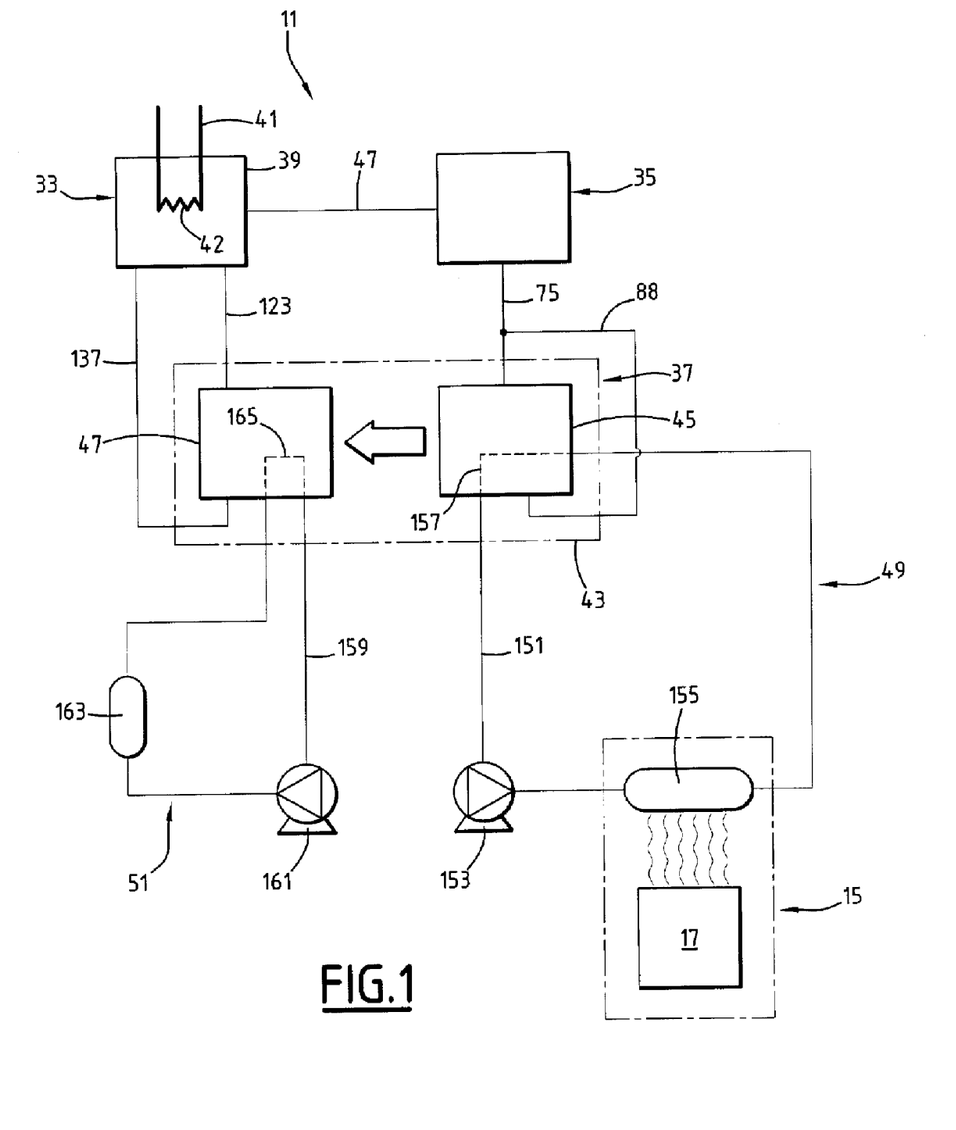
FIG. 1 is a synoptic block diagram of a first cooling device according to the invention.

The first absorption cooling device 11 according to the invention, illustrated in FIG. 1, is, for example, arranged in a motor vehicle. The vehicle comprises in particular a passenger space 15 and a passenger space climate-control assembly 17 which is placed in a heat-exchange relationship with the device 11.

With reference to FIG. 1, the device 11 comprises a device 33 for generating cooling fluid and absorbent fluid by separating a mixed fluid, a condenser 35 for evaporated cooling fluid and an evaporator/absorber assembly 37.

The generator 33 comprises a chamber 39 which is intended to receive the mixed fluid formed by an admixture of liquid cooling fluid and liquid absorbent fluid, and heating means 41.

The absorbent fluid is formed, for example, by a solution of lithium bromide and the cooling fluid is formed by water.

In a variant, the absorbent fluid is formed by water and the cooling fluid by ammonia solution.

The heating means 41 comprise, for example, an engine cooling liquid circulation conduit comprising a region 42 which is arranged in the chamber 39 in order to place the engine cooling liquid in a heat-exchange relationship with the mixed fluid contained in the chamber 39.

The condenser 35 is connected to the generator 33 by means of a conduit 47 for passage of evaporated cooling fluid.

The condenser 35 is arranged in the front face (not illustrated) of the vehicle on the radiator of the engine cooling liquid, upstream with respect to the radiator in the flow direction of air in the front face.

Figure 2:
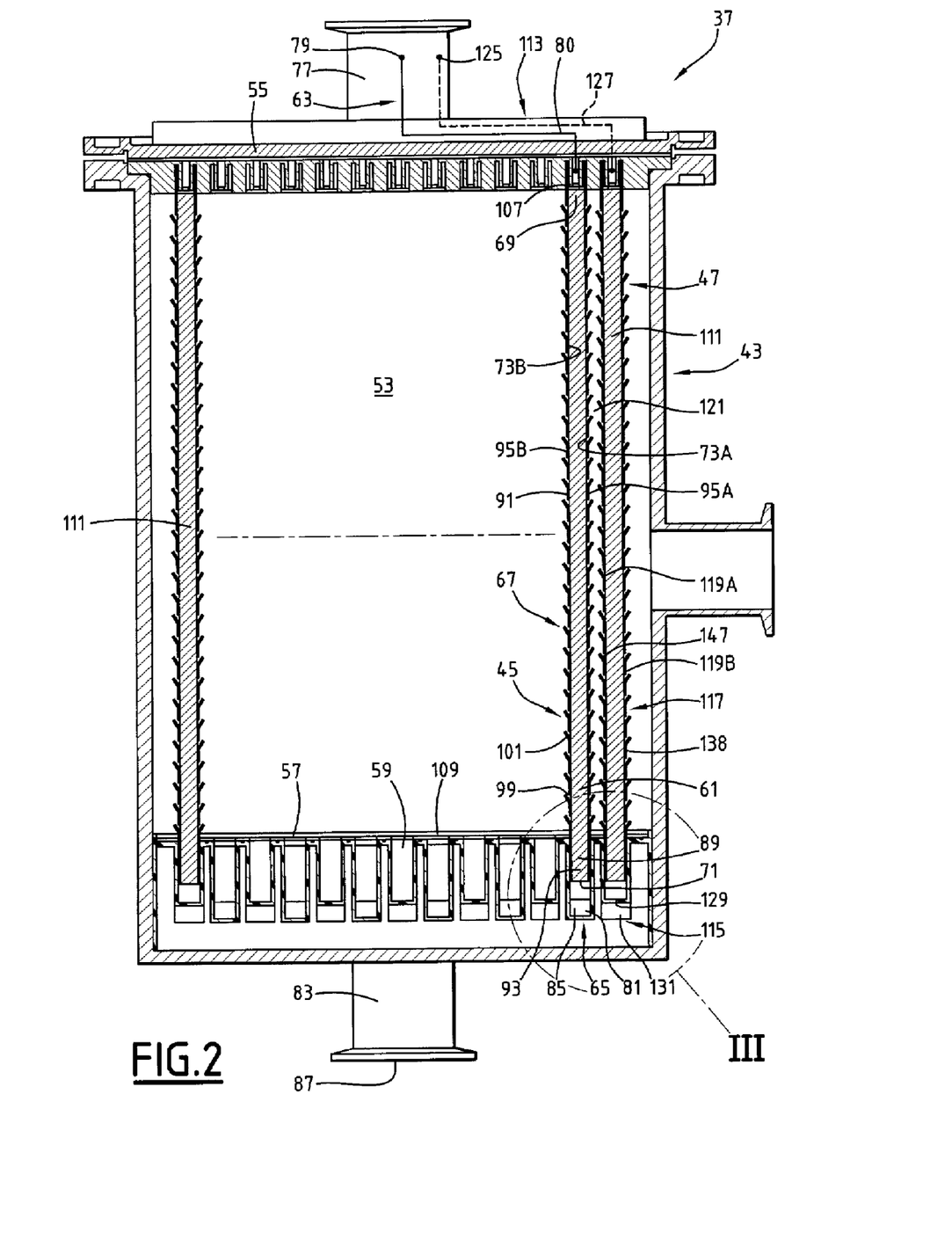
FIG. 2 is a section along a vertical centre plane of a first evaporator/absorber assembly according to the invention, placed in the device of FIG. 1.

As illustrated in FIG. 2, the assembly 37 comprises a sealed casing 43, a plate-type evaporator 45 and a plate-type absorber 47 which are arranged in the sealed casing 43. The assembly 37 further comprises, as illustrated in FIG. 1, a cooling system 49 which is intended to transmit the kilogram calories produced in the evaporator 45 and a cooling system 51 of the absorber 47.

The casing 43 is substantially parallelepipedal. It delimits an inner space 53 which is closed at the top by a cover 55 and, at the bottom, by a base wall 57 which is fixed in a lower portion of the casing. The base wall 57 is constructed using a flexible material. The wall 57 delimits a plurality of horizontal through-holes 59 which open in the inner space 53.

The evaporator 45 comprises a plurality of porous plates 61, a liquid cooling fluid distributor 63 for supplying the plates 61 upstream, and a liquid cooling fluid collector 65 for collecting the liquid cooling fluid downstream of each plate 61. The evaporator 51 further comprises means 67 for preventing the liquid cooling fluid from flowing back towards the inner space 53.

The plates 61 are arranged vertically in the inner space 53 in parallel planes which are spaced transversely from left to right in FIG. 2. In order to simplify the drawing, only one plate 61 has been illustrated in FIG. 2.

Each plate 61 extends between an upper upstream edge 69 which is retained in abutment against the cover 55 and a lower downstream edge 71 which is engaged in the collector 65 via a corresponding aperture 59.

Each plate 61 defines a space which substantially comprises a porous member, for example, of the open-cell foam type or of the type with a randomly drawn surface. The porous member may have a porosity of substantially between 80% and 99% and preferably 93%. It may also comprise a density of openings of between 8 pores per centimeter and 40 pores per centimeter and preferably 16 pores per centimeter. Finally, the porous member may have a rough density of between 0.01 g·cm$^{-3}$ and 1 g·cm$^{-3}$ and preferably 0.2 g·cm$^{-3}$.

Figure 5:
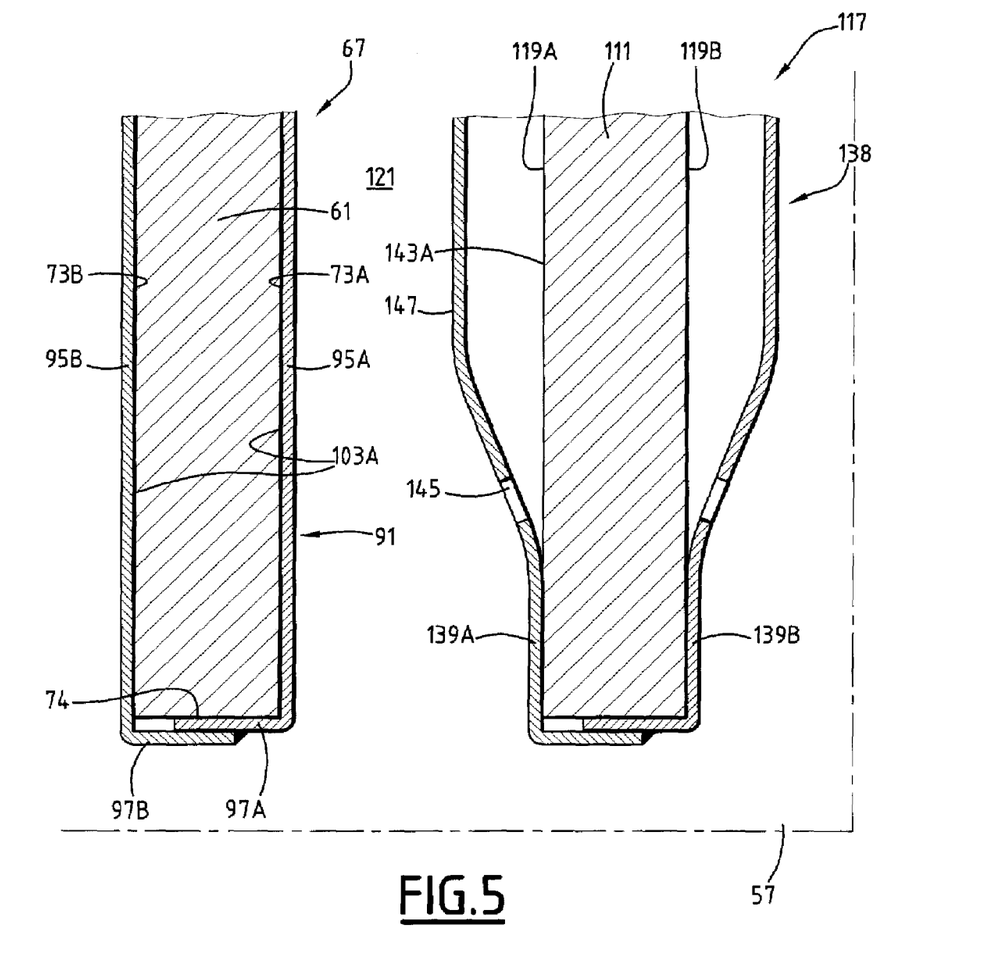
FIG. 5 is a section along the horizontal plane V-V of a detail of FIG. 3.

Each plate 61 defines, at one side and the other of the thickness thereof, two opposing vertical planar gas transfer surfaces 73A, 73B. Each surface 73A, 73B extends in the inner space 53 between the cover 55 and the base wall 57. The vertical surfaces 73A, 73B are connected together at one side and the other of the plate 61 via vertical lateral surfaces 74 which are located on the edge of each plate 61 and which are illustrated in FIG. 5.

The vertical surfaces 73A, 73B may comprise a specific material which is capable of allowing gases to pass through, whilst retaining liquids. They may comprise, for example, a grid of the stainless steel type with fine holes of between 0.01 mm and 1 mm in diameter produced with a wire of between 0.01 mm and 1 mm in diameter. The diameter of the fine holes is preferably equal to or less than 1 mm in order to take advantage from the phenomena of capillarity. The vertical surfaces 73A, 73B may also comprise a membrane of the GORE-TEX®, nylon, polyethylene or polypropylene type. Finally, it may be envisaged that the vertical surfaces 73A, 73B result from a local modification of the porous member of each plate 61 over approximately 1 mm of thickness with the density of the pores per centimeter being increased to, for example, 100 pores per centimeter and preferably 50 pores per centimeter.

The distributor 63 is connected to the condenser 35 via a liquid cooling fluid supply conduit 75 illustrated in FIG. 1. As illustrated in FIG. 2, it comprises an end-piece 77 which is for connecting to the conduit 75 and which delimits a cooling fluid supply inlet 79 for the evaporator 51. The distributor 63 further defines a plurality of channels 80 which are arranged in the cover 55 and which connect the supply inlet 79 to the upper edges 69 of each plate 61.

The collector 65 comprises, for each plate 61, a receptacle 81 which opens in an upward direction via an opening with a horizontal cross-section which is substantially equal to the horizontal cross-section of an aperture 59 and a common end-piece 83 for discharge of liquid cooling fluid.

Each receptacle 81 is fitted under the base wall 57 in a sealed manner by means of an adhesive joint.

The upper opening of the receptacle 81 thus extends opposite a corresponding aperture 59 so that each receptacle 81 receives a downstream region 89 of the plate 61 in the region of the lower downstream edge 71 thereof.

Figure 4:
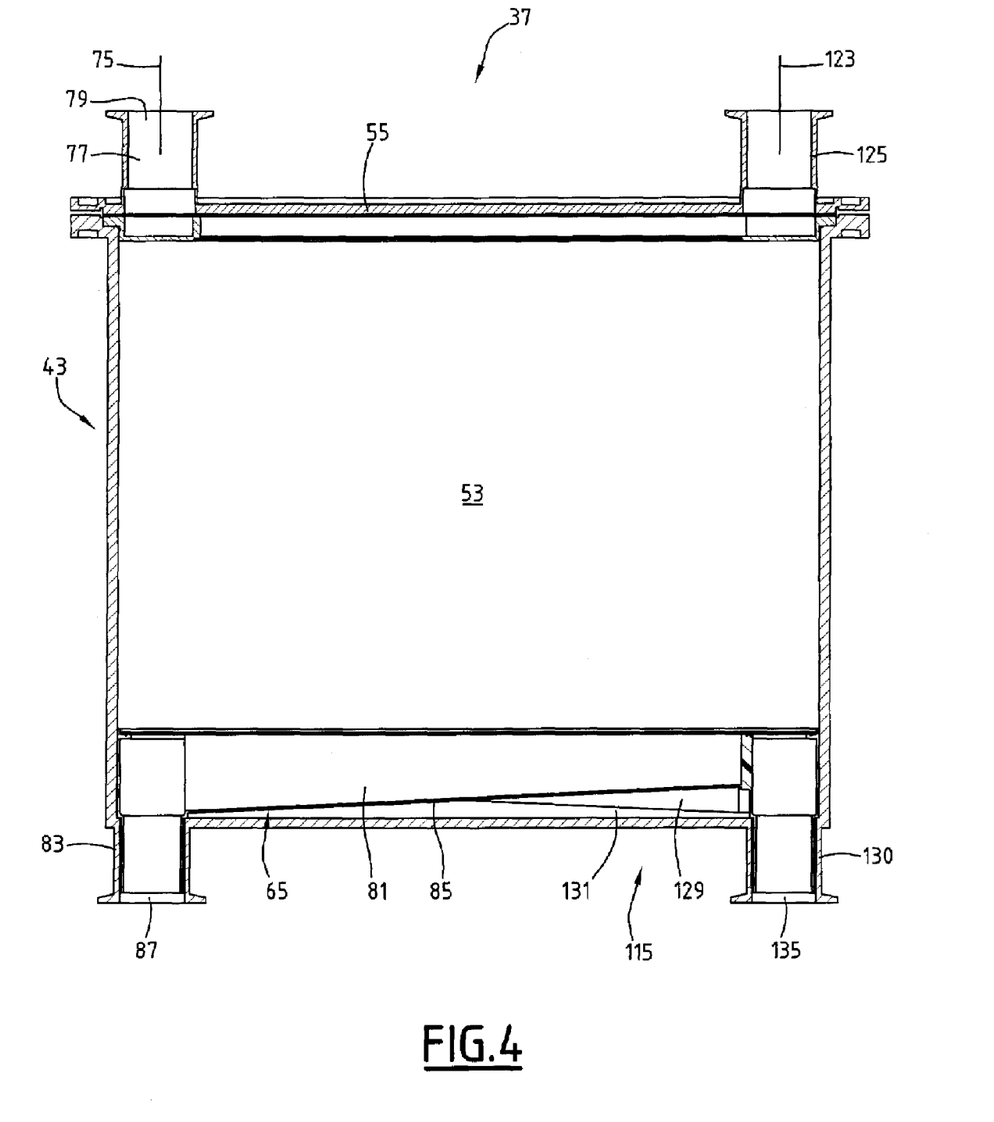
FIG. 4 is a partial cross-section, along a vertical plane perpendicular relative to the plane of section of FIG. 2, of the casing of the evaporator/absorber assembly of FIG. 2.

As illustrated in FIG. 4, each receptacle 81 comprises a base wall 85 which is inclined in a downward direction and towards the left in FIG. 4, in the direction of the discharge end-piece 83 in which all the receptacles 81 open.

The end-piece 83 delimits a lower downstream outlet 87 for discharge of liquid cooling fluid. The end-piece 83 protrudes in a downward direction from a left-hand edge of the casing 43 in FIG. 4. In this example, the end-piece 83 of the collector 65 is connected to the liquid coolant fluid supply conduit 75 via a recirculation conduit 88 which can be seen in FIG. 1 and which is provided with a pump (not illustrated).

The means 67 for preventing backflow comprise, for each plate 61, a partition liner 91 which surrounds the plate 61 and a porous pad 93 interposed between each collector 65 and the space 53. Of course, between each plate 61 and each partition liner 91, there may be surfaces 73A and 73B in accordance with one of the variants explained above.

As illustrated in FIGS. 2 and 5, each liner 91 comprises partition walls 95A, 95B which are pressed, respectively, on the gas transfer surfaces 73A, 73B and which are connected to each other by means of lateral skirts 97A, 97B which are attached to each other in a sealed manner over the lateral surfaces 74.

Each wall 95A, 95B delimits, opposite the surfaces 73A, 73B, a plurality of horizontal openings 99 which extend substantially over the entire width of the plate 61. Each wall 95A, 95B comprises, for each opening 99, an inclined guiding fin 101. The wall thus has a structure referred to as "clere-story".

The fins 101 protrude relative to the surface 73A, 73B in an upward direction and away from the surface 73A, 73B facing each opening 99, from the lower edge defining each opening 99. Preferably, the spacing of the fins 101 relative to each surface 73A, 73B is between 0.5 and 5 mm in order to adapt to the size of the drops which may form. In the case of this example, fins 101 whose spacing is substantially equal to 2 mm and thickness is substantially equal to 1 mm allow the majority of drops to be guided.

Figure 3:
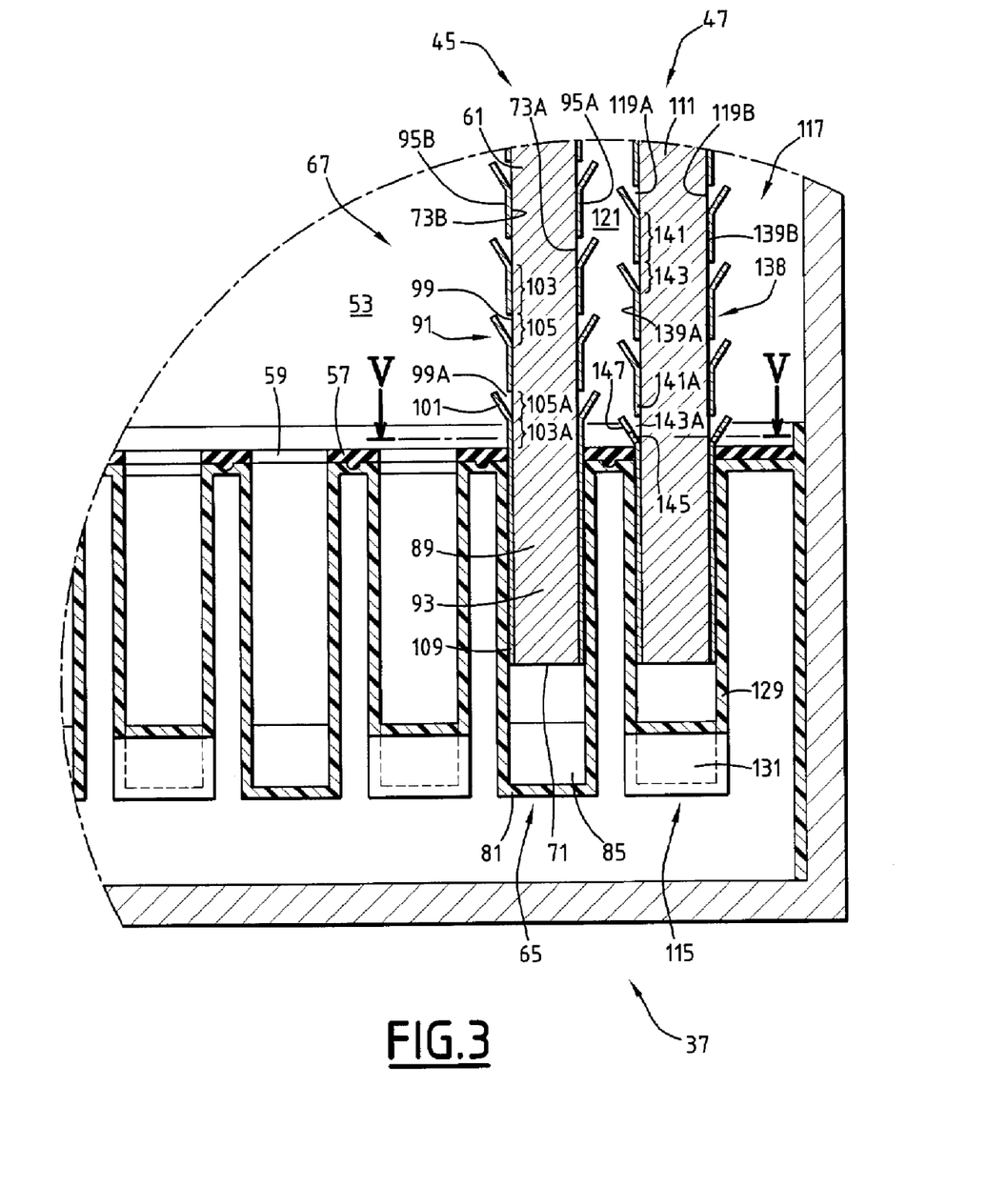
FIG. 3 is an enlarged view of a detail designated III in FIG. 2.

As illustrated in FIG. 3, each wall 95A, 95B thus delimits on the corresponding surface 73A, 73B a plurality of regions 103 which are covered by the wall 95A, 95B and a plurality of uncovered regions 105 for passage of gas.

In this FIG. 3, it is also possible to see a downstream covered region 103A which extends from the base wall 57 to a first downstream opening 99A which forms the uncovered region 105A above and remote from the base wall 57, in order to prevent the liquid cooling fluid from flowing back from the collector 65 towards the inner space 53 owing to the associated inclined guiding fin 101. The downstream region 103A extends over the entire width of the plate 61.

Preferably, according to the invention, each wall 95A, 95B comprises an open "clere-story" structure only over the first downstream covered region 103A and uncovered region 105A which is used to guide towards the plate 61 any drops present on the surfaces 73A and 73B, respectively. Each wall 95A, 95B preferably comprises, over the remainder of the surface thereof, that is to say, as far as the upstream region 69, a mesh of polymer, for example, of the cell type, whose configuration and distribution is capable of strengthening the porous member of each plate 61 whilst providing an opening surface which is at least equal to 50% of each surface 73A, 73B.

Each wall 95A, 95B comprises an upper continuation 107 which can be seen in FIG. 2 and which is inserted in the cover 55, and a lower continuation 109 which can be seen in FIG. 3 and which is interposed between the receptacle 81 and the lower region 89 of the plate 61.

Each plate 61 is thus wedged in the casing 43 by the partition liner 91 thereof.

Each porous pad 93 is formed by the region 89 of the plate 61 inserted into the receptacle 81. In a variant, a porous pad 93 is formed in a material which is separate from that of the plate 61.

The absorber 47 comprises a plurality of plates 111, a distributor 113 for absorbent fluid and a collector 115 for mixed fluid.

The absorber 47 further comprises means 117 for preventing mixed fluid from flowing back into the inner space 53.

The plates 111 may have a structure which is identical to that of the gas transfer plates 61 and will not be described in detail. They are arranged in the inner space 53, parallel with the transfer plates 61 and are mounted so as to surround each face of each plate 61. Only two plates 111 at the ends of the casing 43 are illustrated in FIG. 2, The plates 111 delimit, at one side and the other of their thickness, respective surfaces 119A, 119B for passage of gas. The vertical surfaces 119A, 119B may comprise a specific material which is capable of allowing the gases to pass whilst retaining the liquids. They may comprise, for example, a grid of the stainless steel type with fine holes of between 0.1 mm and 1 mm in diameter produced with a wire of between 0.01 mm and 1 mm in diameter. The diameter of the fine holes is preferably equal to or greater than 0.1 mm in order to prevent salts from obstructing them. The vertical surfaces 119A, 119B may also comprise a membrane of the GORE-TEX®, nylon, polyethylene, or polypropylene type. Finally, it may be envisaged that the vertical surfaces 119A, 119B result from a local modification of the porous member of each plate 111 over approximately 1 mm of thickness with the pore density per centimeter being increased to, for example, 100 pores per centimeter and preferably 50 pores per centimeter.

Each surface 73A, 73B of a transfer plate 61 is located facing a gas passage surface 119A, 119B of a plate 111. The surfaces 73A, 73B and 119A, 119B together delimit, with the base wall 57 and the cover 55, a chamber 121 for migration of gaseous cooling fluid from the surface 73A, 73B to the surface 119A, 119B.

The distributor 113 for liquid absorbent fluid is provided in the cover 55. The distributor 113 is connected to the chamber 39 of the generator 33 via a liquid absorbent fluid supply conduit 123.

The distributor 113 comprises an end-piece 125 for connection to the conduit 123, located at the edge opposite the end-piece 77 on the cover 55 and conduits 127 for passage of liquid absorbent fluid connecting the end-piece 125 to an upstream upper edge of each plate 111.

The collector 115 comprises, for each plate 111, a receptacle 129 for collecting liquid mixed fluid and an end-piece 130 for discharge of mixed fluid common to all the receptacles 129.

Each receptacle 129 has a structure which is similar to the receptacles 81 of the collector 65 for liquid cooling fluid. The receptacles 129 are thus fixed below the base wall 57 and have an opening for passage of the plate 111.

The receptacles 81 for liquid cooling fluid and the receptacles 129 for liquid mixed fluid are spaced apart moving transversely along a horizontal axis perpendicular relative to the plates 111 and 61, from left to right in FIGS. 2 and 3.

In the embodiment of FIG. 2, the collector 115 for absorbent fluid and the collector 65 for cooling fluid are integral.

As illustrated in FIG. 4, each receptacle 129 has a base wall 131 which is inclined towards the end-piece 130 for discharge of mixed fluid.

The end-piece 130 for discharge of mixed fluid protrudes in a downward direction from the right-hand edge of the casing 43 in FIG. 4, opposite the end-piece for discharge of cooling fluid 83. The end-piece 130 delimits an outlet 135 for discharge of mixed fluid.

The downward inclinations of the respective base walls 85 and 131 of the receptacles 81 for liquid cooling fluid and the receptacles 129 for mixed fluid are directed in opposing directions in order to guide the liquid cooling fluid and the mixed fluid, towards the end-pieces 83, 130, respectively.

The collector 115 is connected to the chamber 39 of the generator 33 via a conduit 137 for recirculation of mixed fluid which is connected to the end-piece 130.

The means 117 for preventing the backflow of mixed fluid comprise, for each plate 111, a covering liner 138 which has a similar structure to the partition liner 91 of the plates 61. The liners 138 will therefore not be described in detail.

Each liner 138 comprises two walls 139 for covering the respective surfaces 119A, 119B which have horizontal openings in order to form a so-called "open" "clere-story" structure. The walls 139 delimit on each surface 139A, 139B, covered regions 141 and uncovered regions 143 which extend horizontally.

Each uncovered region 105 of a surface 73A, 73B is located facing a covered region 141 of a surface 119A, 119B. In the same manner, each uncovered region 143 of a surface 119A, 119B is located facing a covered region 103 of a surface 73A, 73B.

Furthermore, a downstream uncovered region 143A extends in an upward direction on each surface 119A, 119B from the base wall 57 to a first covered region 141A.

As illustrated in FIG. 5, through-holes 145 which are flush with the base wall 57 are provided in the lateral edges of the fins 147 which cover the downstream uncovered region 143A.

In this manner, the liquid collected on the base wall 57 of the space 53 may be discharged through the openings 145 towards the mixed fluid collector 115.

Preferably, according to the invention, each wall 139A, 139B comprises a structure which is open in "clere-story" only over the first uncovered downstream region 143A which is used to guide towards the plate 111 any drops present on the surfaces 119A and 119B, respectively. Each wall 139A, 139B preferably comprises, over the remainder of the surface thereof, a mesh of polymer, for example, of the cell type, whose configuration and distribution is capable of strengthening the porous member of each plate 111 by providing an opening surface which is at least equal to 50% of each surface 119A, 119B. Only the downstream uncovered region 143 of each wall 139 is opposite the downstream covered region 103 of each wall 95, the uncovered region 105 of each wall 95 facing the mesh, for example, of the cell type, of each wall 143.

With reference to FIG. 1, the cooling system 49 comprises a conduit 151 for circulation of a heat-exchange fluid, a pump 153 and a first heat-exchanger 155 which are mounted in a downstream direction on the conduit 151.

The conduit 151 comprises a region 157 for heat-exchange with each plate 61, this region being able to be formed by vertical conduits which are arranged in the plates 61.

In a variant, the circulation conduit 151 is formed by the conduit 88 for recirculation of liquid cooling fluid. In this instance, the liquid cooling fluid forms the heat-exchange fluid and the first exchanger 155 is mounted on the conduit 88.

The first heat-exchanger 155 is arranged at the outer side of the evaporator/absorber assembly 37, in a heat-exchange relationship with the climate-control assembly 17.

The cooling system 51 comprises a conduit 159 for circulation of a cooling fluid, a pump 161 and a second heat-exchanger 163 which is mounted in a downstream direction on the conduit 159.

The conduit 159 comprises a region 165 for heat-exchange with each plate 111 formed, for example, by conduits which are arranged vertically in the plates 111.

In a variant, the conduit 159 is formed by an upstream portion of the mixed fluid discharge conduit 137. The cooling fluid is formed by a part of the mixed fluid which is reintroduced into the absorber 47 via a branch conduit which opens upstream of the end-piece 125 on the conduit 123.

The second heat-exchanger 163 is mounted on the front face of the vehicle upstream of the radiator.

The operation of the cooling device 11 according to the invention, for the climate-control of the passenger space 15 of a motor vehicle will now be described.

Initially, the generator 33 contains a quantity of mixed fluid sufficient to immerse the region 42 of the heating means 41.

Under the effect of being heated by the region 42, the liquid mixed fluid is separated into a gaseous current of cooling fluid and a liquid absorbent fluid. The gaseous current of cooling fluid is collected in the passage conduit 47, then condensed in the condenser 35 in order to form a current of liquid cooling fluid. This current is introduced into the evaporator 45 via the cooling fluid supply conduit 75. The liquid cooling fluid is thus introduced into the supply inlet 79, then distributed between the different plates 61 through the distributor 63.

The liquid cooling fluid wets the surfaces 73A, 73B from the upstream upper edge 69 to the downstream lower edge 71. The presence of the partition liner 91 allows the liquid cooling fluid to be contained in the plate 61 even if variations of flow rate and/or inclination of the assembly 37 occur, when the vehicle is moving.

Part of the liquid cooling fluid evaporates on the uncovered regions 99 of the surfaces 73A, 73B which produces frigories which are collected by means of heat exchange with the heat-exchange fluid which is circulating in the cooling system 49. These frigories are transmitted to the first heat-exchanger 155 by means of circulation of the heat-exchange fluid from the heat-exchange region 157.

The liquid cooling fluid is collected in the receptacles 81 and flows towards the discharge end-piece 83, guided by the inclined slope of the base wall 85 of the receptacles 81.

The presence of a porous pad 93, formed by the downstream region 89 of the plate 61 which is interposed in the receptacle 81 prevents liquid cooling fluid contained in the receptacle 81 from flowing back towards the space 53.

Furthermore, the presence of a region 103A covered by the surface 73A which extends between the base wall 57 and a first opening 99A also limits the risk of liquid cooling fluid flowing back from the collector 65 into the space 53.

At the same time, the current of liquid absorbent fluid is conveyed from the chamber 39 to the absorber 47 via the liquid coolant fluid supply conduit 123. This current is introduced via the end-piece 125 and is distributed between the various plates 111 by the distributor 113. The current of liquid absorbent fluid flows from the upper edge of the plates 111 towards the lower edge of these plates 111.

The presence of the covering liner 138 around the plates 111 contains the absorbent fluid in the plates 111 as it flows from the upper edge of each plate 111 towards the lower edge.

In the region of the uncovered regions 143 of the surface 119A, the liquid absorbent fluid collects the gaseous cooling fluid which migrates via the chamber 121 from the opposite surface 73A.

The liquid mixed fluid is therefore formed in the plates 111 and collected in the mixed fluid collectors 129, then discharged towards the discharge end-piece 130 for mixed fluid, being guided by the downward inclination of the base walls 131 opposite the discharge end-piece 83 for cooling fluid. The liquid mixed fluid flowing in the plates 111 is cooled by circulating the heat-exchange fluid in the heat-exchange region 165 of the cooling system 51.

The mixed fluid recovered in the receptacle 129 is reintroduced into the generator 33 via the conduit 137.

The space between the receptacles 81 for cooling fluid which have a relatively low temperature and the receptacles 129 for mixed fluid which have a relatively high temperature, mutually insulates these receptacles thermally.

Furthermore, if a liquid is present in the base of the space 53, this liquid is discharged into the receptacles 129 of the mixed fluid collector 115 through the through-openings 147. The downstream wall 103A prevents this liquid from flowing into the collector 65 for liquid cooling fluid.

The risk of contamination of the liquid cooling fluid which flows in the transfer plates 61 is thus limited, even if the assembly 37 is subject to acceleration and/or is inclined during the movement of the motor vehicle.

The invention claimed is:

1. Evaporator/absorber assembly comprising:
    a liquid cooling fluid evaporator which has an upstream liquid cooling fluid supply inlet,
    a gaseous cooling fluid absorber which is connected to the evaporator and which has an upstream liquid absorbent fluid supply inlet;
    wherein the assembly delimits a chamber for migration of gaseous cooling fluid defined (i) by at least one cooling fluid gas transfer surface which is located on the evaporator and connected to the upstream liquid cooling fluid supply inlet, (ii) by at least one surface for passage of evaporated cooling fluid located on the absorber opposite the at least one transfer surface and connected to the upstream liquid absorbent fluid supply inlet, and (iii) by a base wall which connects these surfaces, the evaporator comprising:
    a liquid cooling fluid collector which is connected to the at least one transfer surface in order to collect the liquid cooling fluid downstream of the at least one transfer surface; and
    partition means which are arranged in the chamber and which delimit, on the at least one transfer surface, at least one region which is covered by the partition means and at least one uncovered transfer region,
    wherein the partition means comprise a first portion pressed on the at least one covered region of the transfer surface, said first portion have at least one opening facing the uncovered transfer region of the transfer surface, and a second portion forming a guiding fin which protrudes upwardly at an acute angle from a lower edge of the opening and into the chamber with respect to the first portion.

2. The assembly according to claim 1, wherein the partition means delimit on the at least one transfer surface a covered downstream region which extends transversely over the entire width of the transfer surface and which extends from the base wall to an uncovered transfer region which is located remote from and above the base wall.

3. The assembly according to claim 2, wherein the partition means comprise, over the remainder of the at least one transfer surface, a reinforcement mesh substantially above the uncovered region in order to maximise the percentage of opening surface-area.

4. The assembly according to claim 1, wherein the cooling fluid supply inlet is connected to an upstream edge of the at least one transfer surface, the partition means delimiting on the transfer surface, an alternate arrangement of covered transfer regions and uncovered transfer regions between the base wall and the upstream edge.

5. The assembly according to claim 1, wherein the guiding fin faces the at least one uncovered region and protrudes away from the at least one uncovered region of the transfer surface.

6. The assembly according to claim 5, wherein each guiding fin extends away from the transfer surface by a distance between 0.5 and 5 mm in order to adapt to the size of the drops which may be formed.

7. The assembly according to claim 1, wherein the evaporator comprises at least one member which delimits two opposing transfer surfaces which are connected together by means of lateral surfaces, the partition means extending in a tight manner over the lateral surfaces.

8. The assembly according to claim 1, which comprises a porous block which is interposed between the cooling fluid collector and the at least one transfer surface.

9. The assembly according to claim 1, wherein the cooling fluid collector is located below the base wall and is applied below the base wall.

10. The assembly according to claim 1, wherein the absorber comprises:
    a collector for a liquid mixed fluid formed by an admixture of absorbent fluid and cooling fluid, connected to the at least one passage surface in order to collect the mixed fluid downstream of the at least one passage surface; and
    at least one wall for covering the at least one passage surface delimiting on the at least one passage surface at least one downstream uncovered region which extends from the base wall, the downstream uncovered region opening in the chamber.

11. The assembly according to claim 10, wherein the covering wall comprises, on the remainder of the at least one passage surface, a reinforcement mesh substantially above the downstream uncovered region in order to maximise the percentage of opening surface-area.

12. The assembly according to claim 10, wherein the covering wall comprises at least one covered region above the downstream uncovered region.

13. The assembly according to claim 12, wherein the at least one uncovered region of the transfer surface is located opposite a covered region of the passage surface.

14. The assembly according to claim 10, wherein the at least one uncovered passage region is located opposite a covered region of the transfer surface.

15. The assembly according to claim 10, wherein the downstream uncovered region which opens in the chamber comprises a collection opening which is flush with the base wall in order to discharge the liquid fluids present on the base wall into the collector.

16. The assembly according to claim 10, wherein the cooling fluid collector comprises at least one cooling fluid receptacle which has a base which is inclined in a first direction towards a liquid cooling fluid discharge outlet, the mixed fluid collector comprising at least one liquid mixed fluid receptacle which has a base which is inclined in a second direction separate from the first direction, towards a mixed fluid discharge outlet.

17. The assembly according to claim 10, wherein the covering wall comprises, facing the at least one uncovered region of the passage surface, a downstream guiding fin which protrudes into the chamber with respect to a face of the passage surface,
wherein the downstream guiding fin protrudes in the chamber upward and toward the evaporator.

18. The assembly according to claim 17, wherein the at least one uncovered region of the transfer surface is located opposite a covered region of the passage surface.

19. The assembly according to claim 17, wherein the covering wall comprises a first wall portion pressed on the at least one covered region of the passage surface, said first wall portion have at least one passage opening facing the uncovered transfer region of the passage surface, and a second wall portion forming a covering wall guiding fin which protrudes upwardly at an acute angle from a lower edge of the passage opening and into the chamber with respect to the first wall portion.

20. The assembly according to claim 1, wherein the partition means comprise partition walls on opposite transfer surfaces of the evaporator, said partition walls being attached to each other in a sealed manner over lateral surfaces of the evaporator.

21. The assembly according to claim 1, wherein the evaporator comprises a porous member and the at least one transfer surface is a surface of the porous member.

22. Absorption cooling device comprising:
a device for generating cooling fluid and absorbent fluid by means of separation of a mixed fluid;
a cooling fluid condenser, connected to the generator;
an evaporator/absorber assembly according to claim 1, the evaporator being connected to the condenser by means of a cooling fluid supply conduit which opens in the cooling fluid supply inlet, the absorber being connected to the generator via an absorbent fluid supply conduit which opens in the absorbent fluid supply inlet and via a mixed fluid discharge conduit; and
a cooling system based on a heat-exchange fluid, placed in a heat-exchange relationship with the at least one transfer surface, the cooling system comprising a first heat-exchanger located outside the evaporator.

23. Motor vehicle comprising a device according to claim 22.

* * * * *

UNITED STATES PATENT AND TRADEMARK OFFICE
CERTIFICATE OF CORRECTION

PATENT NO.       : 8,640,490 B2                                              Page 1 of 1
APPLICATION NO.  : 12/299268
DATED            : February 4, 2014
INVENTOR(S)      : Cossenet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this
Twenty-second Day of September, 2015

Michelle K. Lee
*Director of the United States Patent and Trademark Office*